Patented Apr. 26, 1938

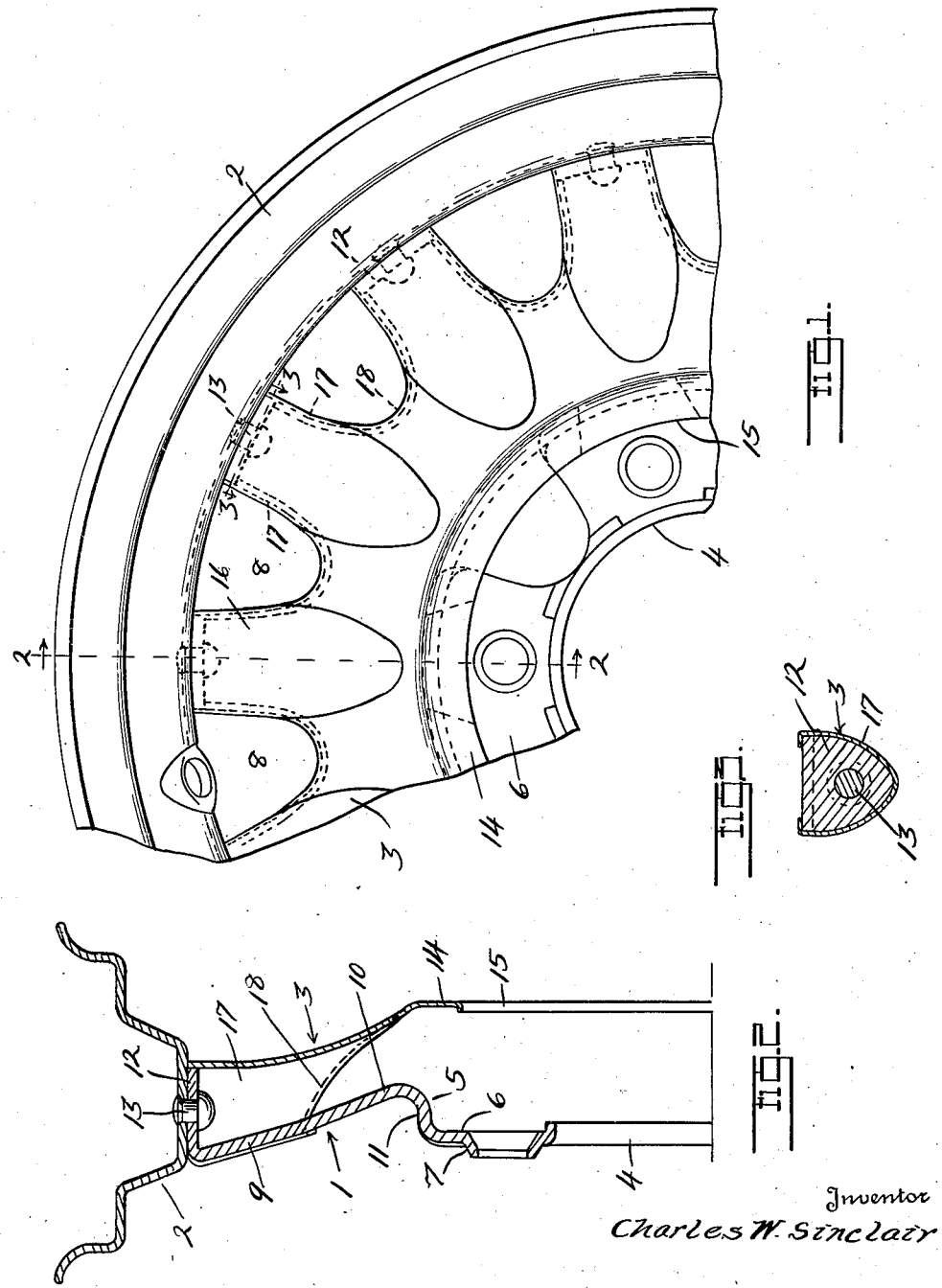

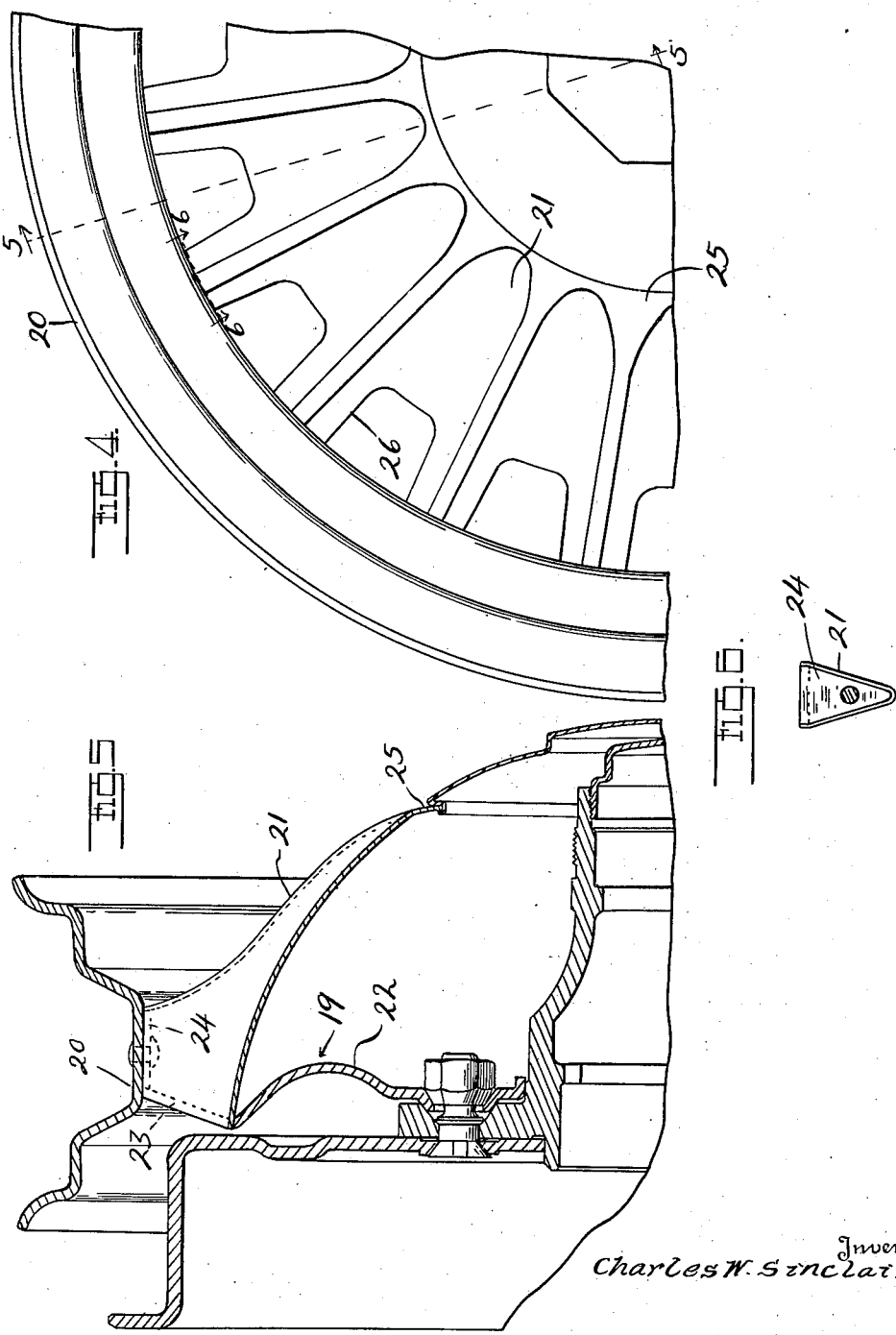

2,115,182

UNITED STATES PATENT OFFICE 2,115,182

WHEEL

Charles W. Sinclair, Detroit, Mich., assignor to The Kelsey-Hayes Wheel Company, Detroit, Mich., a corporation of Delaware Application October 28, 1932, Serial No. 640,103

1 Claim. (Cl. 301—37)

The invention relates to wheels and refers more particularly to wheels of the spoked type for use in motor vehicles. The invention has for one of its objects to so construct a wheel that it has the necessary strength to withstand the stresses to which it is subjected during use; that it has a highly pleasing appearance; and that it may be manufactured at relatively low cost. Another object is to so construct the wheel that the load supporting wheel body member is concealed by a cover, which latter has spoke simulating arms and is so constructed that it may be readily and cheaply made and given a highly finished appearance.

These and other objects of the invention will become apparent from the following description, taken in connection with the accompanying drawings, in which Figure 1 is a front elevation of a portion of a wheel showing an embodiment of my invention;

Figures 2 and 3 are cross sections on the lines 2—2 and 3—3, respectively, of Figure 1;

Figure 4 is a front elevation of a portion of a wheel showing another embodiment of my invention;

Figures 5 and 6 are cross sections on the lines 5—5 and 6—6 respectively of Figure 4.

The wheel embodying my invention is designed particularly for use in motor vehicles and is of the demountable type. This wheel has the wheel body 1, the tire carrying rim 2, and the cover 3. The wheel body is a sheet metal web member having the central or axial opening 4 for sleeving over the barrel of an inner hub. The wheel body has the central or hub portion 5 which has the radially extending part 6 formed with the angularly spaced frusto-conical or tapered driving projections 7 which extend rearwardly or toward the inboard side of the wheel and are adapted to engage correspondingly inclined walls of recesses formed in the inner hub member and more particularly in its radially extending fixed flange. The web member is adapted to be detachably secured to the inner hub member in a usual manner as by means of bolts extending through the frusto-conical or tapered driving projections 7 and nuts threaded upon these bolts and engaging the front or outboard faces of these projections. The wheel body is formed with the peripherally or angularly spaced openings 8 which form the load supporting spoke portions 9. As shown, these spoke portions are inclined outwardly and inwardly or toward the inboard side of the wheel, as is also the outer part 10 of the central or hub portion 5, there being the substantially axially extending part 11 connecting the parts 6 and 10. The outer ends of the spoke portions 9 are provided with the transverse flanges 12 which extend forwardly or toward the outboard side of the wheel and the rim 2 which is of the drop-center type has the base of its well mounted upon and fixedly secured to the outer faces of these flanges. As shown in the present instance, rivets 13 secure the base of the well to the flanges.

The cover 3 is also formed of sheet metal, such as sheet steel, duralumin or the like, of light gauge, since the load is carried by the wheel body 1. This cover has the central annular portion 14 which is formed with the central or axial opening 15 of a diameter to permit the passage therethrough of a wrench to engage the securing nuts. This cover also has peripherally or angularly spaced openings which form the arms 16 radiating from the central or hub portion 14. The openings in the cover are so located that the arms 16 register with the load supporting spoke portions 9 of the wheel body. These arms are U-shaped and rearwardly opening and their outer ends encircle the flanges 12 and their side walls are secured at their rear edges to the edges of the spoke portions. As specifically shown, the side walls 17 of the arms extend around the edges of the spoke portions and are crimped over the spoke portions at their rear or inboard sides. The central or hub portion 14 of the cover has the rearwardly extending outer wall 18 which connects the side walls of the adjacent arms and has its rear edge crimped over the outer part of the part 10 of the wheel body. It will thus be seen that the parts 14 and 18 of the cover produce a hub simulating portion of the wheel and that the U-shaped arms produce spoke simulating portions of the wheel. A suitable hub cap may be secured to the central or hub part 14 of the cover.

As shown in Figures 4, 5 and 6, the motor vehicle wheel has the wheel body 19 which is preferably a sheet metal web member, the tire carrying rim 20 which, as shown, is of the drop-center type and the cover 21 which is preferably formed of sheet metal. The web member is provided radially outwardly beyond its anchoring portion with the annular bead or rib 22 from which the load supporting spoke portions 23 extend. The rim is secured to the transverse flanges 24 at the outer ends of these spoke portions. The cover 21 has the central annular portion 25 which is spaced forwardly from the central portion of the wheel body a substantial distance. This cover also has the integral arms 26 radiating from its central portion and having side walls diverging rearwardly or toward the inboard side of the wheel and secured at their rear edges to the edges of the load supporting spoke portions 23 by suitable means, such as crimping or welding. The front portions or apices of the arms between their side walls are continued radially inwardly to be substantially flush with the central portion 25 adjacent its opening, the parts of the central portion between its apices being curved outwardly and rearwardly or toward the inboard side of the wheel and having their outer edges secured to the outer edge of the annular bead or rib 22 between the load supporting spoke portions 23. With this arrangement, the central portion and the cover is in effect more distinctly fluted than that shown in Figures 1, 2 and 3.

From the above description, it will be seen that I have provided a strong, substantial construction of motor vehicle wheel in which the wheel body carries the load and this wheel body is so designed that it may be manufactured at relatively low cost. It will also be seen that the cover conceals the spoke portions and also part of the central or hub portion of the wheel body, so that this wheel body need not be given a finished appearance. Furthermore, the cover may be readily formed from a sheet metal blank by a stamping operation and it is so constructed that it will readily receive a finished appearance and may be easily secured to the wheel body and produce in effect a tubular or solid spoked type of wheel.

What I claim as my invention is:

In a wheel, a wheel body comprising a load supporting sheet metal member having peripherally spaced openings therethrough forming load supporting spoke portions, said spoke portions having transverse forwardly extending flanges at their outer ends, and a sheet metal cover at the front side of said member and having peripherally spaced openings therethrough forming arms registering with said spoke portions, said arms abutting the front edges of said transverse flanges and having rearwardly extending side walls secured to said spoke portions.

CHARLES W. SINCLAIR.